(12) United States Patent
Park et al.

(10) Patent No.: US 10,575,318 B2
(45) Date of Patent: Feb. 25, 2020

(54) DATA TRANSMISSION METHOD AND USER EQUIPMENT, AND DATA RECEPTION METHOD AND BASE STATION

(71) Applicant: LG Electronics Inc., Seoul (KR)

(72) Inventors: Sangmin Park, Seoul (KR); Sungduck Chun, Seoul (KR); Jinsook Ryu, Seoul (KR); Laeyoung Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 2 days.

(21) Appl. No.: 16/077,292

(22) PCT Filed: Feb. 10, 2017

(86) PCT No.: PCT/KR2017/001499
§ 371 (c)(1),
(2) Date: Aug. 10, 2018

(87) PCT Pub. No.: WO2017/138780
PCT Pub. Date: Aug. 17, 2017

(65) Prior Publication Data
US 2019/0053252 A1 Feb. 14, 2019

Related U.S. Application Data

(60) Provisional application No. 62/293,785, filed on Feb. 11, 2016.

(51) Int. Cl.
*H04W 72/10* (2009.01)
(52) U.S. Cl.
CPC ................................ *H04W 72/10* (2013.01)

(58) Field of Classification Search
None
See application file for complete search history.

(56) References Cited

U.S. PATENT DOCUMENTS

| 2011/0065470 A1 | 3/2011 | Zhang et al. |
| 2015/0181462 A1 | 6/2015 | Iwai et al. |

FOREIGN PATENT DOCUMENTS

| KR | 10-2014-0116409 | 10/2014 |
| WO | 2011-136558 | 11/2011 |

OTHER PUBLICATIONS

International Search Report and Written Opinion in International Application No. PCT/KR2017/001499, dated Jun. 12, 2017, 16 pages (with English Translation).
Srinivasa Rao et al., "Protocol Signaling Procedures in LTE," Radisys Corporation White Paper, pp. 1-11, Jun. 8, 2011.

(Continued)

*Primary Examiner* — James P Duffy
(74) *Attorney, Agent, or Firm* — Fish & Richardson P.C.

(57) ABSTRACT

User equipment may send a channel allocation request (hereinafter referred to as a first channel allocation request) to a network for transmission of data. When the transmission of data has backed off, the user equipment may send a channel allocation request (hereinafter referred to as a second channel allocation request) again for the transmission of data. At this time, the second channel allocation request may be transmitted to the network together with a priority raise request if a remaining timeframe $T_{remain}$ of an upper timeframe T is smaller than a certain guard time.

14 Claims, 9 Drawing Sheets

(56) References Cited

OTHER PUBLICATIONS

Extended European Search Report in European Application No. 17750472.7, dated Jun. 18, 2019, 8 pages.
Vaidya et al., "Network Congestion Control: Mechanisms for Congestion Avoidance and Recovery," ACWR 11 Proceedings of the 1st International Conference on Wireless Technologies for Humanitarian Relief, dated Nov. 2011, pp. 199-207, XP55078319.

(a) UE-P-GW user plane with E-UTRAN (b) Control Plane UE-MME

DATA TRANSMISSION METHOD AND USER EQUIPMENT, AND DATA RECEPTION METHOD AND BASE STATION

CROSS-REFERENCE TO RELATED APPLICATIONS

This application is a National Stage application under 35 U.S.C. § 371 of International Application No. PCT/KR2017/001499, filed on Feb. 10, 2017, which claims the benefit of U.S. Application No. 62/293,785, filed on Feb. 11, 2016. The disclosures of the prior applications are incorporated by reference in their entirety.

TECHNICAL FIELD

The present invention relates to a wireless communication system, and more particularly, to a method and apparatus for transmitting/receiving data.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

The present invention provides a method of ensuring data transmission within an upper-bound timeframe for a delay-tolerant UE in a 3GPP universal mobile telecommunication system (UMTS)/evolved packet system (EPC)-based mobile communication system or its subsequent mobile communication system.

In an aspect of the present disclosure, a method of transmitting data by a user equipment (UE) is provided. The method may include transmitting a first channel allocation request for the data transmission to a network; receiving a back-off time $T_{BO}$ from the network; and transmitting a second channel allocation request to the network, after the back-off time $T_{BO}$ elapses. If a remaining timeframe $T_{remain}$ of an upper-bound timeframe T for the data transmission is less than a guard time, the second channel allocation request may be transmitted together with a priority raise request to the network.

In another aspect of the present disclosure, a UE for transmitting data is provided. The UE includes a radio frequency (RF) unit, and a processor configured to control the RF unit. The processor may be configured to control the RF unit to transmit a first channel allocation request for the data transmission to a network, to control the RF unit to receive a back-off time $T_{BO}$ from the network, and to control the RF unit to transmit a second channel allocation request to the network, after the back-off time $T_{BO}$ elapses. If a remaining timeframe $T_{remain}$ of an upper-bound timeframe T for the data transmission is less than a guard time, the second channel allocation request may be transmitted together with a priority raise request to the network.

In another aspect of the present disclosure, a method of receiving data from UE by a network node is provided. The method includes receiving a first channel allocation request for the data transmission from the UE; transmitting a back-off time $T_{BO}$ to the UE; if a second channel allocation request is received from the UE, after the back-off time $T_{BO}$ elapses, and the channel allocation request is received together with a priority raise request, allocating a channel to the UE with priority; and receiving the data from the UE.

In another aspect of the present disclosure, a network node for receiving data from a UE is provided. The network node includes a radio frequency (RF) unit, and a processor configured to control the RF unit. The processor may be configured to control the RF unit to receive a first channel allocation request for the data transmission from the UE, to control the RF unit to transmit a back-off time $T_{BO}$ to the UE, and if a second channel allocation request is received from the UE, after the back-off time $T_{BO}$ elapses, and the channel allocation request is received together with a priority raise request, to allocate a channel to the UE with priority, and to control the RF unit to receive the data from the UE.

In each aspect of the present disclosure, the priority raise request may include information indicating that the second channel allocation request is a retry of a channel allocation request for the data transmission, or the number of retries.

In each aspect of the present disclosure, if the remaining timeframe $T_{remain}$ is larger than the guard time, the second channel allocation request may be transmitted without the priority raise request to the network.

In each aspect of the present disclosure, the guard time may be determined on the basis of the upper-bound timeframe T or the back-off time $T_{BO}$.

In each aspect of the present disclosure, the remaining timeframe $T_{remain}$ may be obtained by comparing the upper-bound timeframe T with a time delay $T_{delay}$ from an initial try of the channel allocation request for the data transmission, where $T_{delay}$=N*{default value of the back-off time}. N may be a retry counter value indicating a retry number of the second channel allocation request after the initial try.

In each aspect of the present disclosure, allocation information about a radio channel for the data transmission from the network may be provided to the UE, and the data may be transmitted/received on the radio channel on the basis of the allocation information.

In each aspect of the present disclosure, each of the first channel allocation request and the second channel allocation request may be transmitted/received in a service request message.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to the present invention, data can be transmitted/received efficiently for a delay-tolerant UE.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
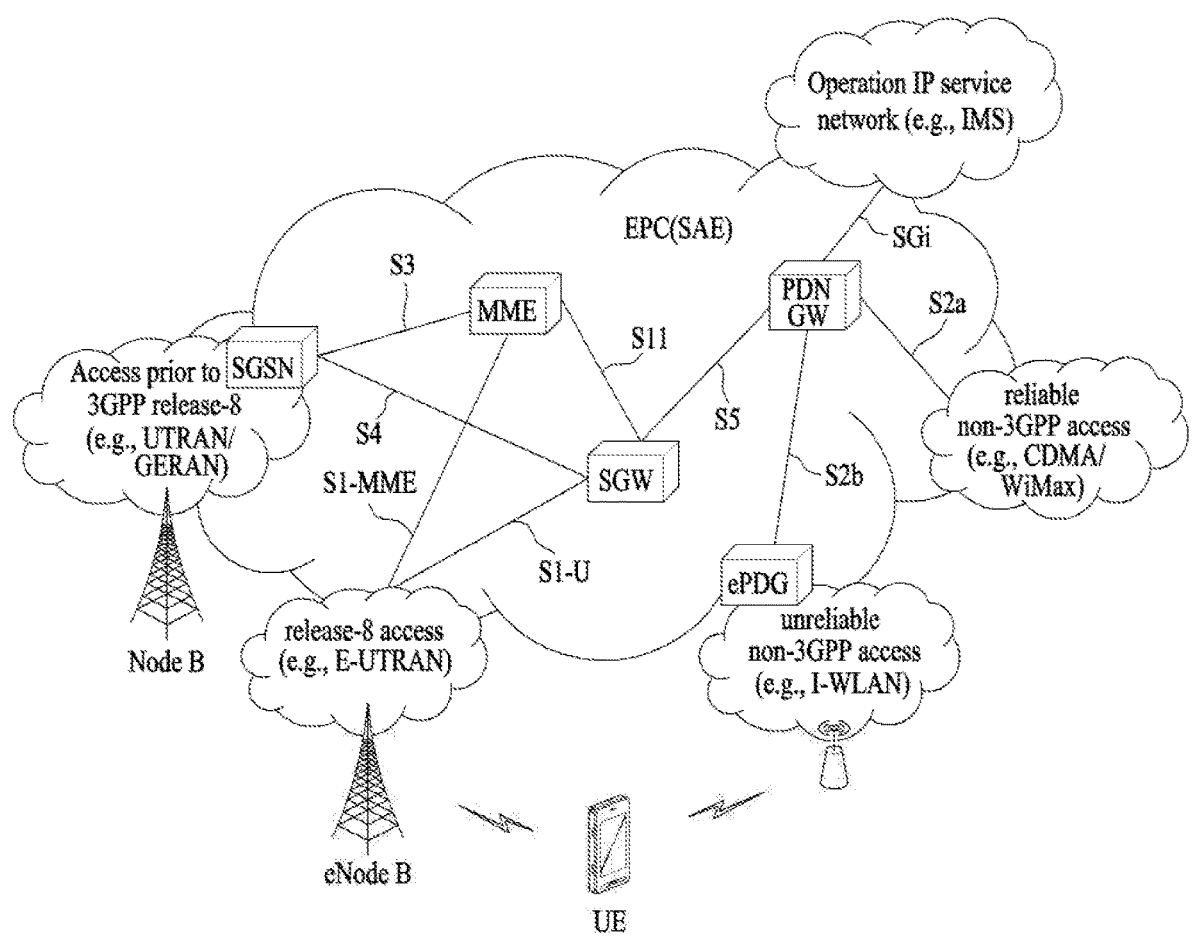
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.008, 3GPP TS 24.301, 3GPP TS 23.228, 3GPP TS 29.228, 3GPP TS 2 5 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3 GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |

TABLE 1-continued

| Reference Point | Description |
| --- | --- |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
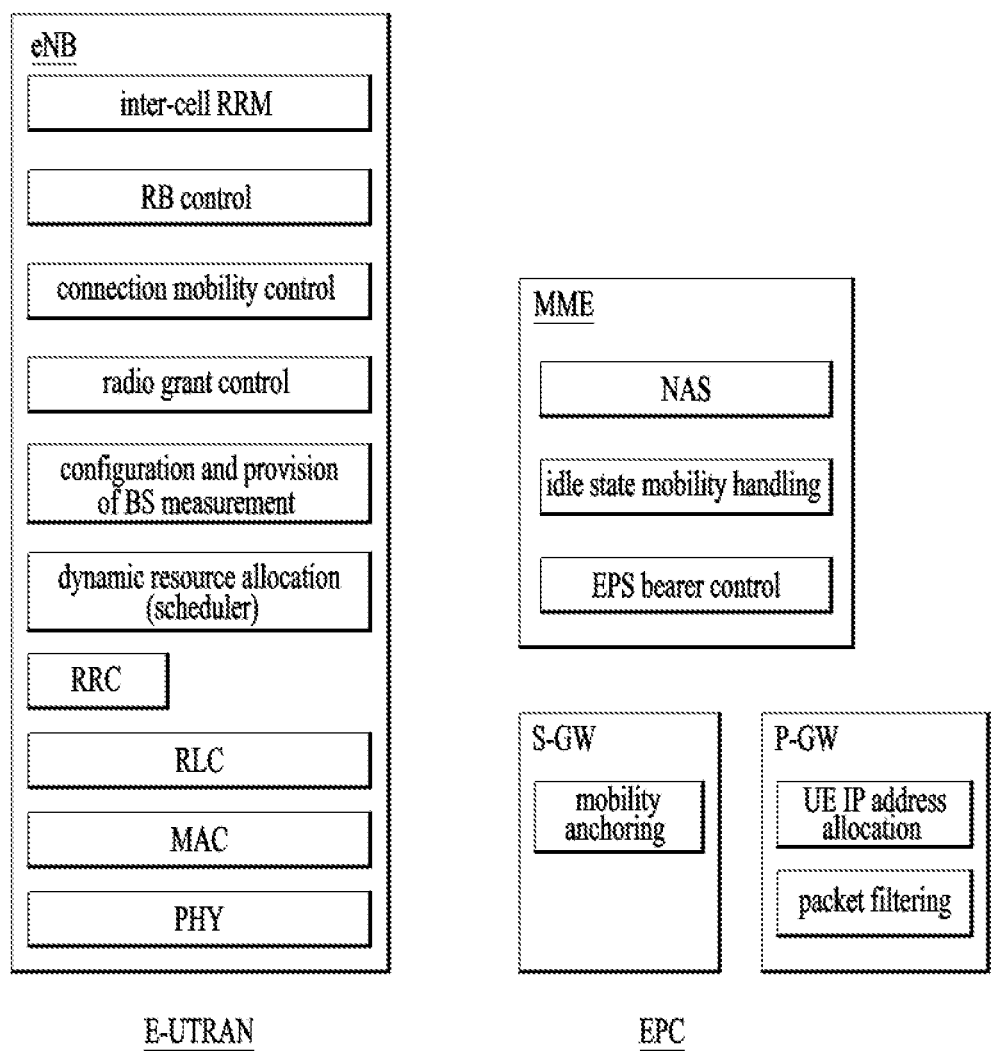
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
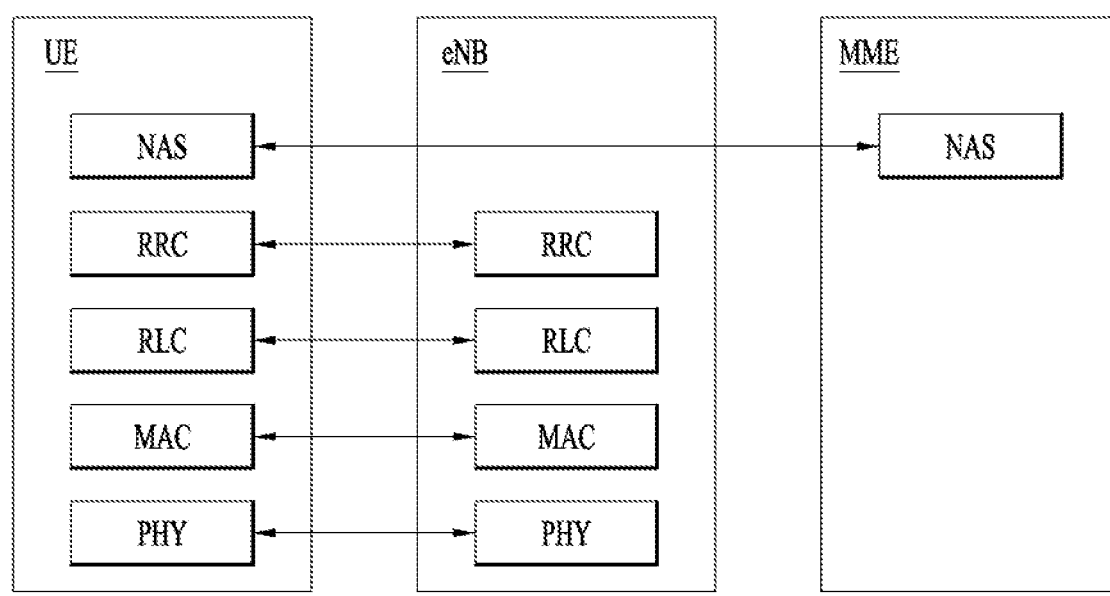
FIG. 3 is a diagram exemplarily illustrating the structure of a radio interface protocol in a control plane.
Figure 4:
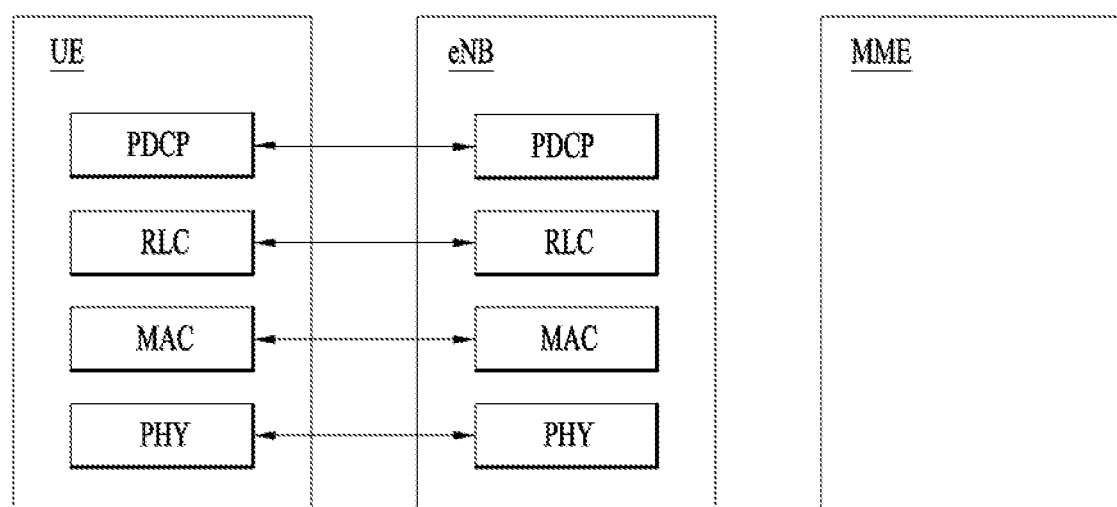
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC_connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The NAS forms the highest stratum of the control plane between a UE and an MME. The main functions of the protocols that are part of the NAS are to support mobility of the UE and session management procedures for establishing and maintaining IP connectivity between the UE and a P-GW. The NAS security is an additional function of the NAS that provides services to the NAS protocols, for example, integrity protection and ciphering of NAS signaling messages. To support these functions, elementary procedures for EPS mobility management (EMM) and elementary procedures for EPS session management (ESM) are supplied. Further, complete NAS transactions consist of specific sequences of elementary procedures.

Hereinafter, the procedures used for mobility management for EPS services at the radio interface will be described. The main function of a mobility management sublayer is to support the mobility of the UE such as informing the network of its current location and providing user identity confidentiality. Another function of the mobility management sublayer is to provide connection management services to a session management (SM) sublayer and a short message services (SMS) entity of a connection management (CM) sublayer. All EMM procedures can be performed only when a NAS signaling connection has been established between the UE and network. Otherwise, the EMM sublayer initiates the establishment of the NAS signaling connection. Depending on how the EMM procedures can be initiated, the EMM procedures can be classified into the following three types: EMM common procedures; EMM specific procedures; and EMM connection management procedures (S1 mode only). The EMM common procedures can always be initiated while the NAS signaling connection exists. In the case of the EMM specific procedures, only one UE initiated EMM specific procedure can be running at any time. The EMM specific procedures include attach, detach, tracking area update, etc. The EMM connection management procedures include service request, paging request, transport of NAS messages, and generic transport of NAS messages.

The ESM (EPS Session Management) belonging to the NAS layer performs functions such as default bearer management and dedicated bearer management to control a UE to use a PS service from a network. In other words, the main function of an ESM sublayer is to support EPS bearer context handling in the UE and MME. The ESM includes a procedure(s) for the activation, deactivation and modification of EPS bearer contexts and a procedure(s) for the request for resources (IP connectivity to a PDN or dedicated bearer resources) by the UE. In addition, when a UE establishes the initial connection to a specific packet data network (PDN) to access to the network, the default EPS bearer resource may be allocated by the network. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR. A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The details of the EMM and ESM procedures could be found in 3GPP TS 24.301.

Figure 5:
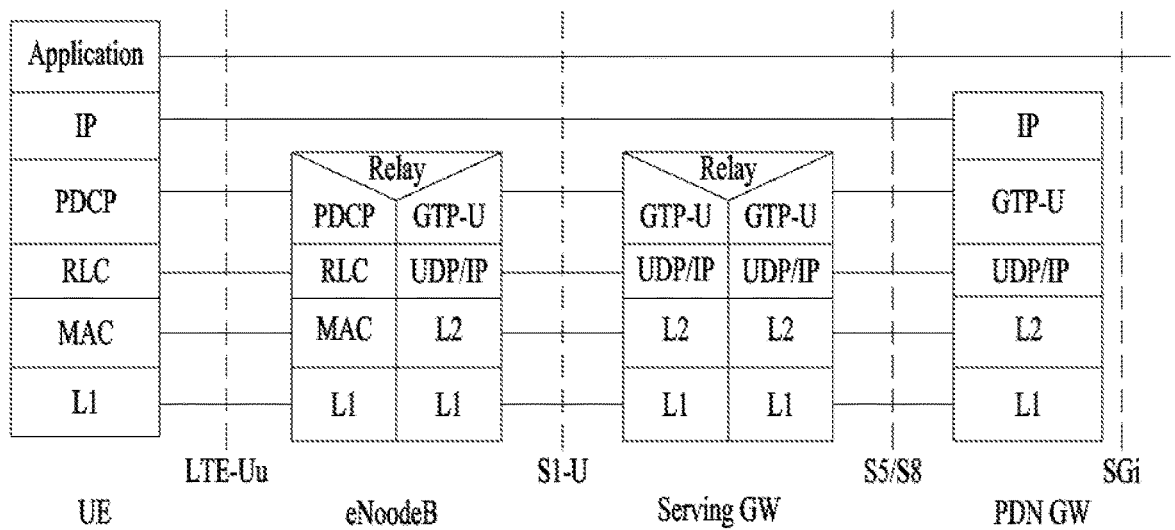
FIG. 5 is a diagram illustrating LTE (Long Term Evolution) protocol stacks for a user plane and a control plane.
Figure 5:
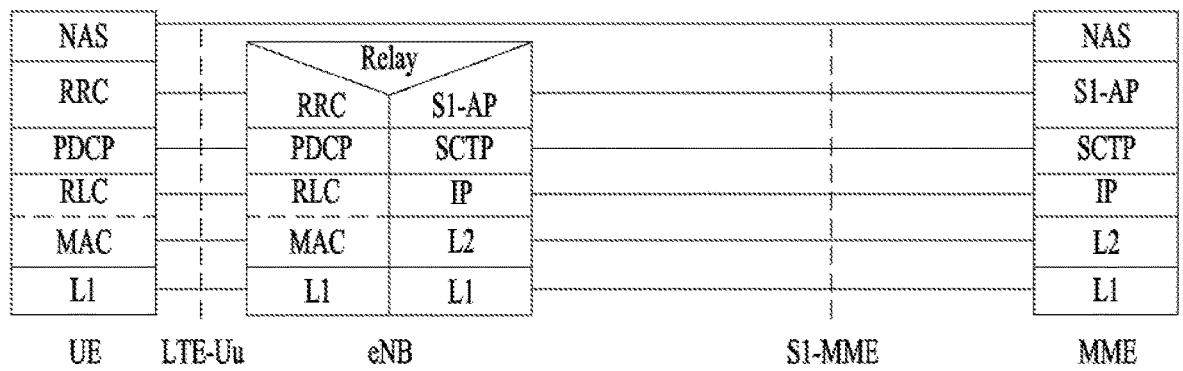

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
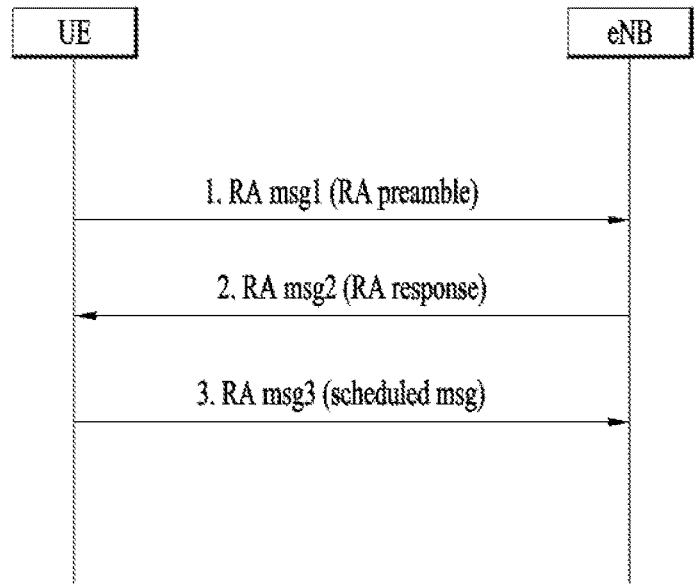
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

>1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

>2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

>3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
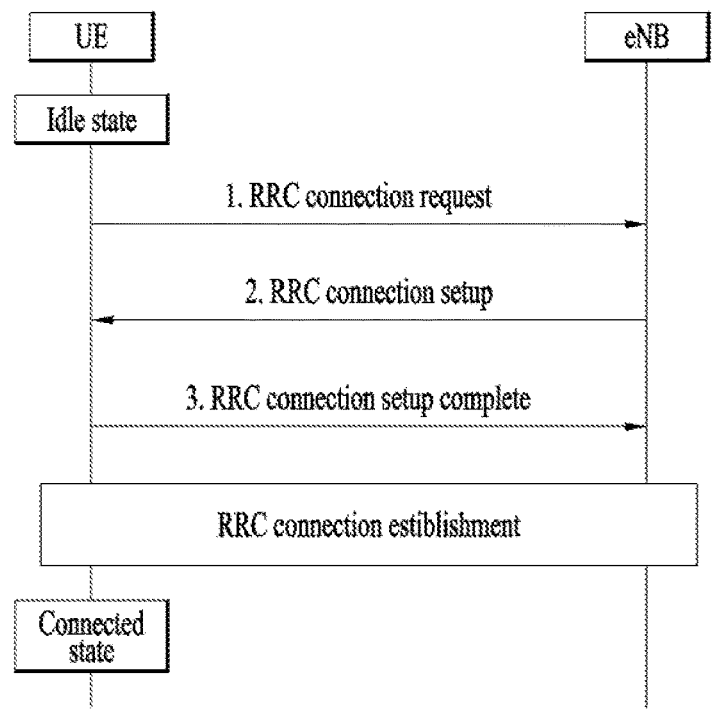
FIG. 7 is a diagram illustrating a connection procedure in a radio resource control (RRC) layer.
Figure 8:
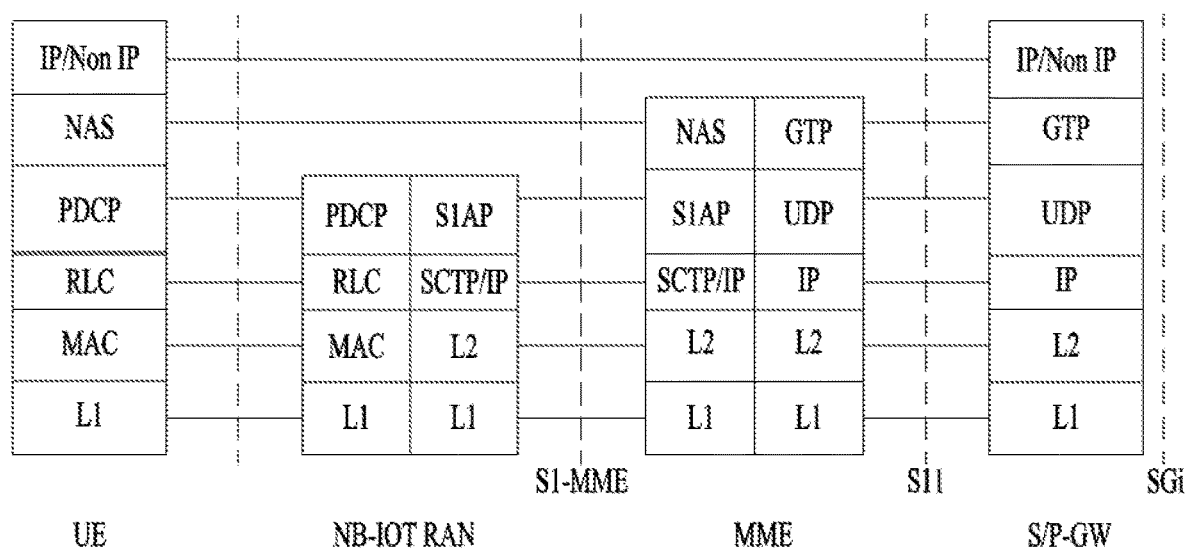
FIG. 8 illustrates user plane protocol stacks between a UE and a P-GW in accordance with the Control Plane CIoT EPS optimization.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

>1. When the UE in the idle state desires to establish RRC connection for reasons such as an attempt to make a call, a data transmission attempt, or a response of the eNB to paging, the UE transmits an RRC connection request message to the eNB first.

>2. Upon receiving the RRC connection request message from the UE, the eNB accepts the RRC connection request of the UE when the radio resources are sufficient, and then transmits an RRC connection setup message, which is a response message, to the UE.

>3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support 'IoT' devices characterized as ultra-low complexity, power limitation and low data rates.

The CIoT network or technology mainly provides communication services optimized for the IoT UE in terms of the core network, and the NB-IoT (narrowband Internet of Thing) network or technology optimizes the radio interface of the existing LTE technology for IoT.

As its name implies, the NB-IoT is a wireless technology that provides IoT services using a narrowband frequency of about 200 kHz. Compared to the conventional LTE technology using the minimum frequency band of about 1.25 MHz, the NB-IoT uses a very small frequency band. Therefore, the NB-IoT minimizes the processing power and power consumption of the UE.

The CIoT is a technology that minimizes the power consumption of the UE through the C-plane solution (that is, data is processed by the MME) or the U-plane solution (that is, even if the UE is in the RRC_IDLE state or a similar state, the UE and eNB maintains the context and use the context for the next connection in order to prevent the power consumption issue of the UE, which is caused because a number of messages are exchanged during the conventional attach or service request procedure.

Therefore, the NB-IoT radio technology and CIoT technology can be applied separately. That is, even if the NB-IoT radio technology is not used, it is possible to apply the CIoT technology through the conventional LTE radio network. This means that the CIoT technology can be applied to UEs that cannot use the NB-IoT radio technology, for example, UEs already released with the LTE radio technology only. In addition, it means that conventional LTE radio technology based cells can support conventional LTE UEs such as smart phones while simultaneously supporting IoT UEs.

A huge number of devices may have various data, transmission, and bandwidth requirements in a 5G system. Besides high-reliability, low-latency use cases, there may be use cases which require stability and are high latency-tolerant. If a service used by a UE tolerates a high latency or delay, data may only have to be transmitted within a predetermined timeframe. For example, in a service of periodically reporting a value measured by a specific sensor, this data may not need to be transmitted immediately. Rather, the data may have to be transmitted within a predetermined time (e.g., 24 hours). Although the data may be delayed due to congestion caused by data transmitted by a large number of UEs, the data should be transmitted without fail. Such use cases include, for example, payment information collection, storage update, search engine update, and software upgrade download to a 3GPP device. Particularly, when data transmitted by such a UE is lost, the UE may not have a retransmission function, and thus the data needs to be transmitted reliably.

Meanwhile, a network is not always capable of processing a large volume of information, and traffic may have to be prioritized. Referring to the document 3GPP TS 24.301 V13.4.0, a UE configured for NAS signaling low priority (see 3GPP TS 24.368, and 3GPP TS 31.102) indicates this by including the Device properties IE in the appropriate NAS message, and setting the low priority indicator to "MS is configured for NAS signaling low priority", except for the following cases in which the UE shall set the low priority indicator to "MS is not configured for NAS signaling low priority":

- the UE is performing an attach for emergency bearer services;
- the UE has a PDN connection for emergency bearer services established and is performing EPS mobility management procedures, or is establishing a PDN connection for emergency bearer services;
- the UE configured for dual priority is requested by the upper layers to establish a PDN connection with the low priority indicator set to "MS is not configured for NAS signaling low priority";
- the UE configured for dual priority is performing EPS session management procedures related to the PDN connection established with low priority indicator set to "MS is not configured for NAS signaling low priority";
- the UE configured for dual priority has a PDN connection established by setting the low priority indicator to "MS is not configured for NAS signaling low priority" and is performing EPS mobility management procedures;
- the UE is performing a service request procedure for a CS fallback emergency call or 1xCS fallback emergency call;
- the UE is a UE configured to use AC11~15 in selected PLMN; or
- the UE is responding to paging.

The network may use the NAS signaling low priority indication for NAS level mobility management congestion control and APN based congestion control.

If the NAS signaling low priority indication is provided in a PDN CONNECTIVITY REQUEST message, the MME stores the NAS signaling low priority indication within the default EPS bearer context activated due to the PDN connectivity request procedure.

In other words, the MME may apply NAS level mobility management (MM) congestion control, or APN based (or session management) congestion control to UEs for which NAS signaling low priority (hereinafter, referred to as low priority) has been configured. That is, when congestion occurs, the MME may apply a mechanism such as a back-off timer by applying congestion control first to requests of low-priority UEs.

Referring to the document 3GPP TS 24.301 V13.4.0, the network may detect EMM signaling congestion and perform NAS level mobility management congestion control. NAS level mobility management congestion control consists of general NAS level mobility management congestion control and subscribed APN based congestion control.

Under general overload conditions the network may reject mobility management signaling requests from UEs as specified in 3GPP TS 23.401. The network should not reject the following requests:
  requests for emergency bearer services;
  requests from UEs that were received via NAS signaling connections established with RRC establishment cause "High priority access AC 11~15"; and
  requests for CS fallback emergency call or 1xCS fallback emergency call.

When subscribed APN based mobility management congestion control is active for a particular APN, the network may reject attach requests from UEs with a subscription to this APN.

In mobility management the network may detect NAS signaling congestion and start or stop performing the subscribed APN based congestion control based on mobility management level criteria such as:
  rate of mobility management NAS messages from a group of UEs with a subscription to a particular APN exceeds or falls below certain thresholds; and/or
  setting in network management.

When the NAS level mobility management congestion control is active, the network may include a value for the mobility management back-off timer T3346 in the reject messages. The UE starts the timer T3346 with the value received in the mobility management reject messages. To avoid that large numbers of UEs simultaneously initiate deferred requests, the network should select the value for the timer T3346 for the rejected UEs so that timeouts are not synchronised.

For subscribed APN based congestion control the value of timer T3346 for a particular APN may be APN dependent.

The timer T3346 is kept running until it expires or it is stopped, when the UE enters EMM_DEREGISTERED state while the UE remains switched on; and while the USIM remains the same in the UE.

If the UE is switched off when the timer T3346 is running, the UE behaves as follows when the UE is switched on and the USIM in the UE remains the same:
  let t1 be the time remaining for T3346 timeout at switch off and let t be the time elapsed between switch off and switch on. If t1 is greater than t, then the timer shall be restarted with the value t1−t. If t1 is equal to or less than t, then the timer need not be restarted. If the UE is not capable of determining t, then the UE restarts the timer with the value t1; and
  if prior to switch off, timer T3346 was started due to a NAS request message (ATTACH REQUEST, TRACKING AREA UPDATE REQUEST or EXTENDED SERVICE REQUEST) which contained the low priority indicator set to "MS is configured for NAS signaling low priority", then if timer T3346 is restarted at switch on, the UE configured for dual priority handles mobility management requests.

If the UE enters a new PLMN while timer T3346 is running, and the new PLMN is not equivalent to the PLMN where the UE started timer T3346, the UE shall stop timer T3346 when initiating mobility management procedures in the new PLMN.

After change in tracking area identity (TAI) which is not part of TAI list, if the timer T3346 is running and EMM update status is EU1 UPDATED then UE shall set the EMM update status to EU2 NOT UPDATED and enter state EMM-REGISTERED.ATTEMPTING-TO-UPDATE.

Unless it is ensured by a QoS value (e.g., a QoS class ID (QCI)), transmission of data within a specific time is not ensured in the current 3GPP system. Particularly, transmission of data having low-priority characteristics, such as IoT or MTC, may be delayed due to a back-off operation, when a network congestion occurs. For example, the following scenarios may be considered.

Problem 1) Service delay between low-priority UE and network control entity
  a) Since a UE transmitting low-priority data such as IoT or MTC data is not sensitive to a delay, the data does not need to be processed first, but should be transmitted within a specific upper-bound timeframe.
  b) To transmit UL data, the UE transmits signaling for radio resource allocation (e.g., signaling of a procedure such as a NAS service request in an EPC/UMTS network or an RRC connection request in an access stratum (AS) interface, or its equivalent function). At the same time, an upper-bound timeframe T starts to be measured.
  c) In view of congestion in a current corresponding network (a radio link, or an entity responsible for mobility management), a request of a UE is rejected randomly or together with a back-off operation defined by the network.
  d) If this congestion situation lasts, the UE may also be subjected to back-off even in attempting a radio resource allocation request after back-off.
  e) Continuously or when a back-off time/timer value received from the network is large, data may not be transmitted within the upper-bound timeframe T defined for the UE.

Particularly, this problematic situation may often occur according to a back-off time range and an upper-bound timeframe T.

Problem 2)
  a) Although transmission is delayed to some extent due to the scenario of problem 1, a channel of a radio link is allocated in a time less than T, and data of the UE is transmitted on the channel.
  b) A longer time may be taken for a queuing service because of a low service capability of an intermediate node in a core network link other than a radio link.
  c) Or a total transmission time may not satisfy the required upper-bound timeframe T due to a time taken for routing, and various transmission delays after data transmission from the 3GPP system to an external PDN.

In regards to the above problems, data transmission within a specific upper limit time may not be ensured in a 3GPP system (e.g., GSM, UMTS, EPC, or the like) defined by the current standards.

In the case where a delay-tolerant or latency-tolerant UE has only to transmit transmission data within a specific timeframe, the present invention is intended to propose a method of implementing this operation. To apply the present invention, a UE may need the following conditions.

To transmit data, an idle-state UE may need allocation of a channel such as resources or a band for the data transmission by signaling between a network and a mobility management entity (e.g., eNB or NodeB), before transmitting the data. The channel allocation may include a radio channel allocation with a BS (e.g., eNB or NodeB) responsible for a radio link.

For the convenience's sake, a delay-tolerant UE refers to a delay-tolerant UE with an upper-bound timeframe T described in relation to the conventional technology in the present invention. In the present invention, a control entity of a radio network will be referred to as a base station (BS), and a mobility management entity of a core network is referred to as a network.

<Invention Proposal 1-1: Overriding of Low Priority for Data Transmission in Time>

If a UE requires a separate channel allocation for data transmission, the UE may need channel allocations for the data transmission in both of 1) a radio link (e.g., AS), and 2) a link with a network mobility management entity (e.g., NAS). In the case where a data transmission is delayed due to congestion control caused by congestion on these links, the present invention proposes a method of increasing a current data processing priority level configured for a delay-tolerant UE.

* Upper-bound/Maximum Delay Timeframe

A delay-tolerant UE has an upper-bound delay timeframe value for data transmitted by the UE. This value may be pre-configured, as it is included in subscription information of a user. This value may be stored as a part of a UE context in an attach procedure or the like. Or this value may be configured by an application server or a destination to receive delay-tolerant data. Additionally, information indicating a delay-tolerant UE may be stored in the subscription information, and the like, and included as a part of the UE context. In the present invention, the upper-bound delay time value is denoted by T, for the convenience' sake.

There may be a few references for measuring a delay. A delay measurement reference may be a time when a higher layer transfers data to a 3GPP layer (e.g., NAS or PDCP), for transmission of the data, or a time instant in which the physical layer of a UE starts to actually transmit data. A network, a UE, or an operator may appropriately configure an upper-bound delay time value in consideration of a delay after a NAS/AS interface or a delay after a 3GPP domain.

An upper-bound delay time may be applied per UE, per bearer, per flow, or per transmission. The network and the UE may perform operations proposed by the present invention on the basis of an ID of a specific transmission (e.g., procedure transaction ID (PTI) or the like), or a bearer ID.

* Operation During AS/NAS Back-off

Figure 9:
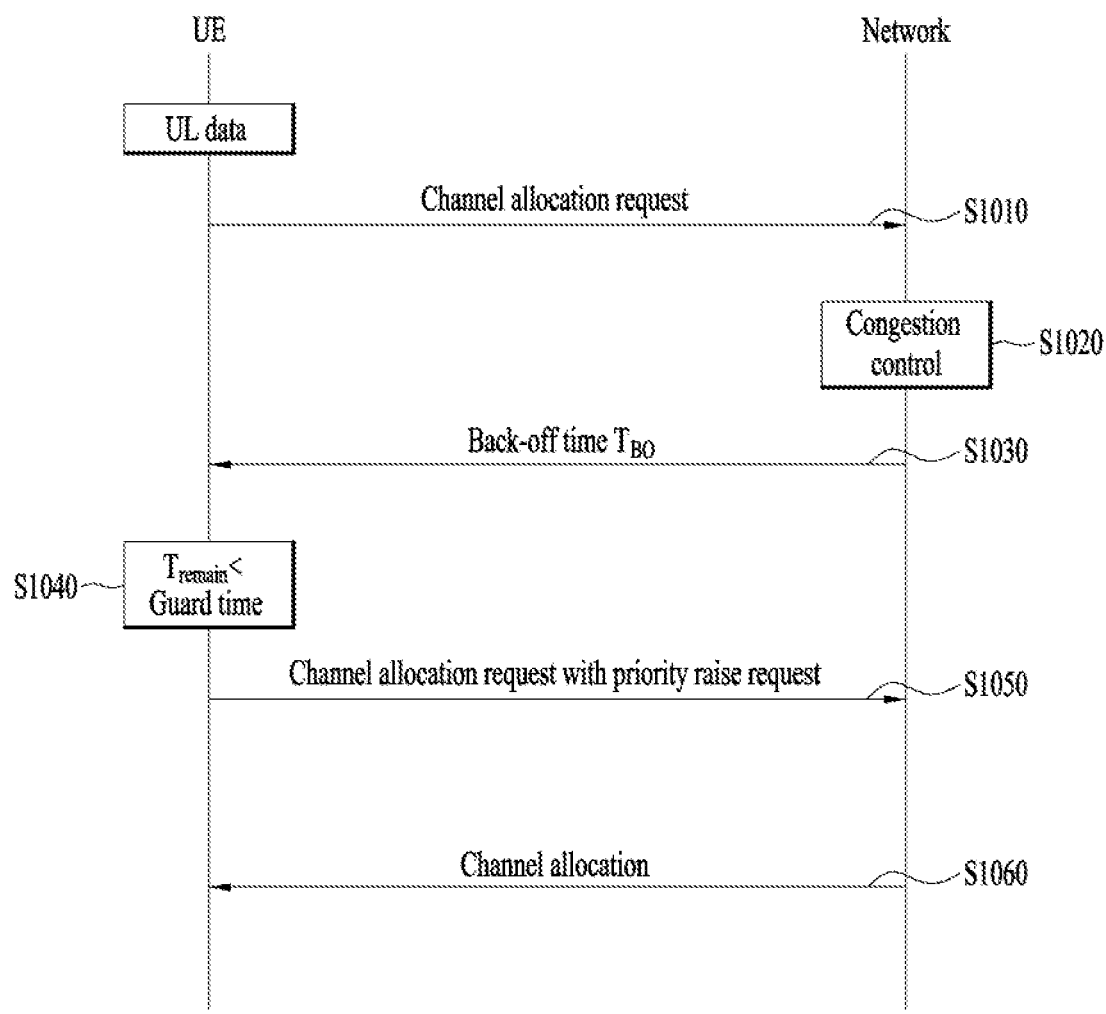
FIG. 9 illustrates a method of transmitting data by a UE according to the present invention.

FIG. 9 illustrates an exemplary data transmission method of a UE according to the present invention.

In the presence of transmission data, the UE may transmit a channel allocation request for transmission of the data (e.g., an attach request, a tracking area updating request, or an extended service request) (S1010).

Congestion control is performed in both of an AS interface and a NAS interface in a current wireless system (S1020). In the AS period, an eNB transmits an extended wait time value to the UE due to congestion of a radio channel (S1030), so that the UE may perform a back-off mechanism. In the NAS interface, in the case of a congestion situation, an MME allocates a NAS back-off timer called T3346 for GMM and EMM messages (S1030), so that the UE may perform the back-off mechanism.

If the UE receives a back-off time value $T_{BO}$ from the network or the eNB (S1030), the UE may consider the following in applying the back-off time value. T may have to be larger than the backoff time $T_{BO}$. Thus, the UE may determine whether the current transmission request is required to satisfy an upper-bound timeframe value set for data transmission. The UE may memorize whether a back-off is applied, when applying the back-off. In this case, the UE may use a counter or set a flag. Or the UE may memorize that the current request for data transmission has been backed-off due to congestion by any other implementation.

A first back-off time elapses, and the UE requests a channel for the data transmission by transmitting signaling for the data transmission again to the network. If the congestion is released, the network will allocate a channel, accepting the request of the UE. However, it may occur that the congestion situation lasts, and thus the network gives a back-off time again to the UE. This situation may occur, even when a second channel allocation or third and other more channel allocations are requested, that is, when a channel allocation request is retried.

The UE may determine that data transmission within a timeframe is required, according to whether a back-off has been applied, the number of back-off applications, or the above proposed condition. Or the UE may determine that data transmission within a current remaining timeframe $T_{remain}$ is required. This decision may be made by comparing the current remaining timeframe $T_{remain}$ with the back-off time $T_{BO}$, or with respect to a predefined specific guard time value. For example, if $T_{remain}$ at the time of retrying a request is less than a defined guard time (e.g., 10% of T), the following proposals may be applied (S1040). The guard time value may be pre-stored in user information, or the network may allocate any guard time value according to the state of the network.

1) Indication of Retry to Network

When the UE retries a channel allocation request, the UE may indicate to the network that a back-off time was given once for the request. This may be performed by a separate parameter/flag. Or the UE may indicate that the channel allocation request is retried by transmitting a retry number to the network by a counter. Or the UE may differentiate the current request from the previous request by a separate message/IE. In an AS interface, the UE may request a channel allocation for UL data transmission to the network by an RRC establishment cause (e.g., emergency or exceptional) other than that for general transmission.

2) Overriding of Conventional Priority

If the UE is configured to have low priority in an AS or NAS interface, and the network applies congestion control on the basis of the low priority, the UE may raise the current priority configured for the UE or a transmission. The UE may set a normal priority for which a priority level is not designated, or a high priority which has priority over others, and this priority may be applied according to a configuration of the network. A priority may be an explicit NAS/AS priority defined in the standards, or implemented in any other manner.

Upon receipt of a priority raise request from the UE (S1050), the network may first allocate resources/a channel or the like without applying back-off even in a congestion situation (S1060).

If the UE uses a counter instead of a separate timer in order to a remaining time of the upper-bound timeframe T, the UE may determine whether a data transmission will satisfy the upper-bound timeframe T as follows.

For the current GPRS GMM (GPRS mobility management)/EMM back-off timer, T3346, the document 3GPP TS 24.008 defines T3346 as follows (refer to Table 11.3a in 3GPP TS 24.008).

TABLE 2

| Timer number | Timer value | State | Cause of start | Normal stop | On Expiry |
|---|---|---|---|---|---|
| T3346 | | GMM-DEREGISTERED.ATTEMPTING-TO-ATTACH GMM-REGISTERED.ATTEMPTING-TO-UPDATE GMM-REGISTERED | ATTACH REJECT, ROUTING AREA UPDATE REJECT or SERVICE REJECT received with a timer value for T3346; "Extended wait time" for PS domain from the lower layers (defined in 3GPP TS 25.331). | Paging received or DETACH REQUEST with the detach type "re-attach required" received see subclause 4.1.1.7 in 3GPP TS 24.008 (A/Gb mode or Iu mode only) | Initiation of GPRS attach procedure, routing area updating procedure or service request procedure, dependent on GMM state and GPRS update status. |
| | | EMM-DEREGISTERED.ATTEMPTING-TO-ATTACH EMM-REGISTERED.ATTEMPTING-TO-UPDATE EMM-REGISTERED (defined in 3GPP TS 24.301). | ATTACH REJECT, TRACKING AREA UPDATE REJECT or SERVICE REJECT (defined in 3GPP TS 24.301) received with a timer value for T3346; "Extended wait time" from the lower layers. (defined in 3GPP TS 36.331). | see subclause 5.3.9 in 3GPP TS 24.301 (S1 mode only) | Initiation of EPS attach procedure, tracking area updating procedure or service request procedure, dependent on EMM state and EPS update status. (defined in 3GPP TS 24.301) |

NOTE:
for T3346, a timer value is provided in an attach reject, routing area updating reject, tracking area updating reject, or service request reject message by the network, provided as an extended wait time by a lower layer, or selected randomly from a default value range of 15 to 30 minutes. In a 5G system, an MM back-off may be implemented similarly to this scheme, and a specific value range or a default value may be defined.

If a counter is used instead of a separate timer, a current delay time from an initial try may be measured as follows. If a retry count is N, $T_{delay}=N*\{$default value of back-off timer$\}$. For example, for T3346, the delay time may be calculated to be N*30 minutes. That is, when the UE transmits a channel allocation request again after expiration of a back-off time, the UE may calculate a total delay time by using the current count, and determine whether a corresponding data transmission will exceed T by comparing the delay time with the upper-bound timeframe T.

If priority handling, or exchange of information indicating whether a back-off has been performed or other necessary information between an AS and a NAS is required in applying the above-described proposal of the present invention, the UE or the network may transfer or exchange information between layers. For example, if a delay-transmission UE, which has received a NAS back-off time, requests channel allocation in one of the foregoing proposed methods, for normal data transmission at a second channel allocation try, the UE may indicate to the AS layer whether this normal transmission is required in order to avoid probable congestion in a radio link. If the NAS layer is to perform a retransmission for transmission within an upper-bound/maximum delay time by applying the proposed technique (override or retransmission/non-retransmission), the NAS layer should transmit to the AS layer information indicating that this transmission should be performed with priority in the radio link.

In a non-congestion control situation, the network may process the request without considering the above proposals. That is, in the non-congestion control situation, the network may allocate a channel to the corresponding UE without considering priority, in the presence of available resources.

<Invention Proposal 1-2: Network Handling of Delay-Tolerant UE Having Upper-Bound Timeframe>

The network may be aware of the situation assumed in Invention Proposal 1-1, that is, information indicating that the UE is a delay-transmission UE and the upper-bound delay time T by a registration procedure such as attach or a user information configuration, and may apply handling to the delay-transmission UE.

When a congestion situation occurs, the UE may apply back-off for congestion control to a channel request for data transmission. Herein, a back-off time value may be less than the determined upper-bound timeframe T. If a possible back-off time range is larger than T due to other conditions, the network may first process the request of the UE instead of applying back-off. For UEs to which back-off has been applied, the network may operate as follows.

1) Process Retry UE with Priority

If the UE is a delay-transmission UE and back-off for congestion control is applied to a first transmission request, the network may memorize whether back-off has been applied to the UE. This may be implemented by a new field of a corresponding UE context, a flag or parameter, or an ID identifying the corresponding request. If the network is aware that the UE is a delay-transmission UE and a channel allocation request of the UE is for data transmission which has been delayed once or more times, the network may allocate a channel to the UE with priority in spite of the congestion situation.

2) Compare T Value

If the network has information about a delay transmission time, that is, an upper-bound timeframe T for the UE, and is capable of calculating a remaining timeframe $T_{remain}$ through a separate timer for each UE, the network may process a transmission request of the UE with priority according to the remaining timeframe $T_{remain}$. In this case, the request of the UE may be processed with priority on the basis of the remaining timeframe $T_{remain}$ irrespective of the contents of the request of the UE, when the congestion situation lasts.

In a non-congestion control situation, the network may process the request immediately with no regard to the foregoing proposals.

Figure 10:
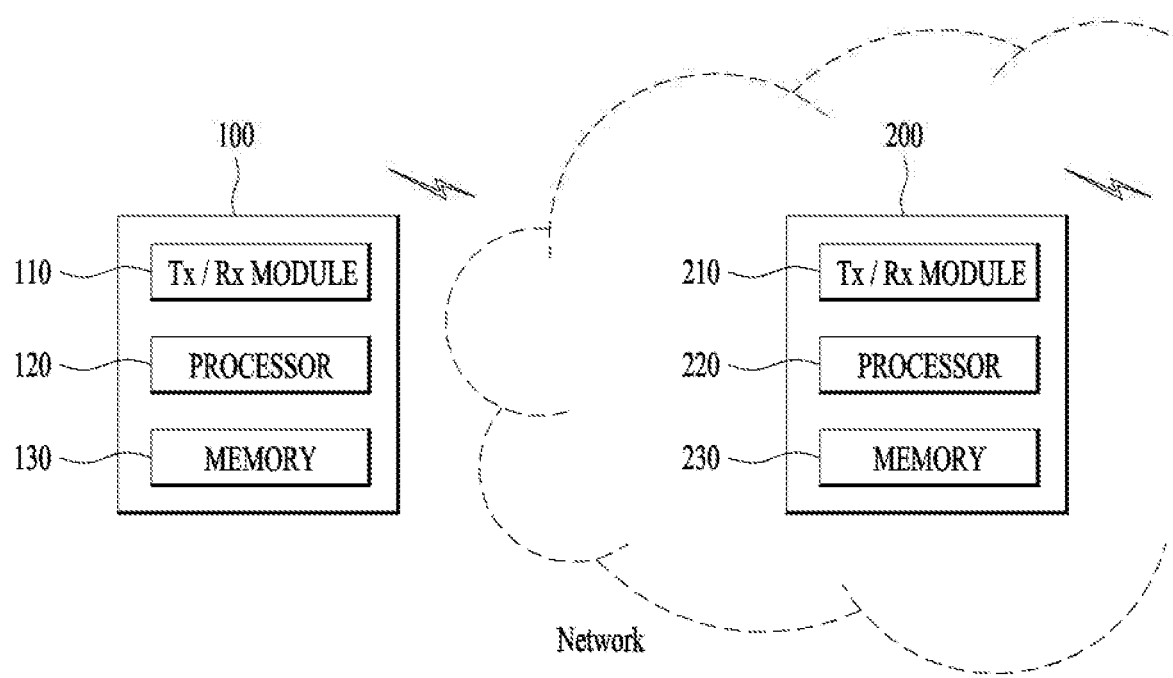
FIG. 10 illustrates a node according to an embodiment of the present invention.

FIG. 10 illustrates configuration of a UE and a network node according to a preferred embodiment of the present invention.

The UE 100 according to the present invention may include a transmitting/receiving (Tx/Rx) module 110, a processor 120, and a memory 130. The Tx/Rx module 110 of the UE 100 may be referred to as a radio frequency (RF) unit. The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the Tx/Rx module 110. The memory 130 may store the calculated and processed information for a predetermined time, and may be replaced by another constituent such as a buffer (not shown).

The network node 200 according to the present invention may include a transmitting/receiving (Tx/Rx) module 210, a processor 220 and a memory 230. If the Tx/Rx module communicates with a UE 100, the Tx/Rx module 210 may be referred to as an RF unit or a transceiver. The Tx/Rx module 210 may be configured to transmit and receive various signals, data and information to and from an external device. The network node 200 may be connected to an external device by wire and/or wirelessly. The Tx/Rx module 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present invention, the processor 220 may control the Tx/Rx module 210 to transmit data or a message to a UE or another network node. The memory 230 may store the calculated and processed information for a predetermined time, and may be replaced by another constituent such as a buffer (not shown).

For configuration of the UE 100 and the network apparatus 200, the details described in various embodiments of the present invention may be independently applied or implemented such that two or more embodiments are simultaneously applied. For simplicity, redundant description is omitted.

The present invention may be implemented through various means. For example, the present invention may be implemented by hardware, firmware, software, or a combination thereof.

When implemented by hardware, a method according to the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method of transmitting data by a user equipment (UE), the method comprising:
   transmitting a first channel allocation request for the data transmission to a network;
   receiving a back-off time $T_{BO}$ from the network; and
   transmitting a second channel allocation request to the network, after the back-off time $T_{BO}$ elapses,
   wherein if a remaining timeframe $T_{remain}$ of an upper-bound timeframe T for the data transmission is less than a guard time, the second channel allocation request is transmitted together with a priority raise request to the network, and
   wherein the priority raise request includes information indicating that the second channel allocation request is a retry of a channel allocation request for the data transmission, or the number of reties.

2. The method according to claim 1,
   wherein if the remaining timeframe $T_{remain}$ is larger than the guard time, the second channel allocation request is transmitted without the priority raise request to the network.

3. The method according to claim 1,
   wherein the guard time is determined based on the upper-bound timeframe T or the back-off time $T_{BO}$.

4. The method according to claim 1,
   wherein the remaining timeframe $T_{remain}$ is obtained by comparing the upper-bound timeframe T with a time delay $T_{delay}$ from an initial try of the channel allocation request for the data transmission, where $T_{delay}=N*\{$default value of the back-off time$\}$, and N is a retry counter value indicating a retry number of the second channel allocation request after the initial try.

5. The method according to claim 1, further comprising:
receiving allocation information about a radio channel for the data transmission from the network, and
transmitting the data on the radio channel on the basis of the allocation information.

6. The method according to claim 1,
wherein each of the first channel allocation request and the second channel allocation request is transmitted in a service request message.

7. A user equipment (UE) for transmitting data, the UE comprising:
a radio frequency (RF) unit; and
a processor configured to control the RF unit,
wherein the processor is configured to control the RF unit to transmit a first channel allocation request for the data transmission to a network, to control the RF unit to receive a back-off time $T_{BO}$ from the network, and to control the RF unit to transmit a second channel allocation request to the network, after the back-off time $T_{BO}$ elapses,
wherein if a remaining timeframe $T_{remain}$ of an upper-bound timeframe T for the data transmission is less than a guard time, the second channel allocation request is transmitted together with a priority raise request to the network, and
wherein the priority raise request includes information indicating that the second channel allocation request is a retry of a channel allocation request for the data transmission, or the number of retries.

8. The UE according to claim 7,
wherein if the remaining timeframe $T_{remain}$ is larger than the guard time, the processor is configured to control the RF unit to transmit the second channel allocation request without the priority raise request to the network.

9. The UE according to claim 7,
wherein the guard time is determined based on the upper-bound timeframe T or the back-off time $T_{BO}$.

10. The UE according to claim 7,
wherein the remaining timeframe $T_{remain}$ is obtained by comparing the upper-bound timeframe T with a time delay $T_{delay}$ from an initial try of the channel allocation request for the data transmission, where $T_{delay}$=N*{default value of the back-off time}, and N is a retry counter value indicating a retry number of the second channel allocation request after the initial try.

11. The UE according to claim 7,
wherein the processor is configured to control the RF unit to receive allocation information about a radio channel for the data transmission from the network, and to control the RF unit to transmit the data on the radio channel on the basis of the allocation information.

12. The UE according to claim 7,
wherein each of the first channel allocation request and the second channel allocation request is transmitted in a service request message.

13. A method of receiving data from a user equipment (UE) by a network node, the method comprising:
receiving a first channel allocation request for the data transmission from the UE;
transmitting a back-off time $T_{BO}$ to the UE;
if a second channel allocation request is received from the UE, after the back-off time $T_{BO}$ elapses, and the channel allocation request is received together with a priority raise request, allocating a channel to the UE with priority; and
receiving the data from the UE,
wherein the priority raise request includes information indicating that the second channel allocation request is a retry of a channel allocation request for the data transmission, or the number of retries.

14. A network node for receiving data from a user equipment (UE), the network node comprising:
a radio frequency (RF) unit; and
a processor configured to control the RF unit,
wherein the processor is configured to control the RF unit to receive a first channel allocation request for the data transmission from the UE, to control the RF unit to transmit a back-off time $T_{BO}$ to the UE, and if a second channel allocation request is received from the UE, after the back-off time $T_{BO}$ elapses, and the channel allocation request is received together with a priority raise request, to allocate a channel to the UE with priority, and to control the RF unit to
receive the data from the UE, and
wherein the priority raise request includes information indicating that the second channel allocation request is a retry of a channel allocation request for the data transmission, or the number of retries.

* * * * *